United States Patent [19]
O'Hanlan

[11] Patent Number: 5,689,643
[45] Date of Patent: Nov. 18, 1997

[54] COMMUNICATION DEVICE FOR TRANSMITTING ASYNCHRONOUS FORMATTED DATA SYNCHRONOUSLY

[76] Inventor: Thomas B. O'Hanlan, 100 Edgemont Ave., Liberty, S.C. 29657

[21] Appl. No.: 353,496

[22] Filed: Dec. 9, 1994

[51] Int. Cl.[6] .............................. G06F 13/12; G06F 13/42
[52] U.S. Cl. .................. 395/200.05; 395/200.1; 395/200.18; 395/550
[58] Field of Search .................. 395/550, 500, 395/200.1, 200.05, 200.18; 370/470, 472, 476

[56] References Cited

U.S. PATENT DOCUMENTS

| | | | |
|---|---|---|---|
| 4,322,580 | 3/1982 | Khan et al. | 179/18 |
| 4,757,499 | 7/1988 | Gorshe | 370/99 |
| 4,823,312 | 4/1989 | Michael et al. | 364/900 |
| 4,839,855 | 6/1989 | Van Driel | 364/900 |
| 4,949,333 | 8/1990 | Gulick et al. | 370/32 |
| 5,140,679 | 8/1992 | Michael | 395/325 |
| 5,371,736 | 12/1994 | Evan | 370/79 |
| 5,428,612 | 6/1995 | Scheffel et al. | 370/84 |
| 5,479,648 | 12/1995 | Barbara et al. | 395/750 |
| 5,517,638 | 5/1996 | Szczepanek | 395/550 |

OTHER PUBLICATIONS

Douglas V. Hall, "Microprocessors and Interfacing –Programming and Hardware," McGraw–Hill, Chapter 13, pp. 442–487, Jan. 1986.

*Primary Examiner*—Alyssa H. Bowler
*Assistant Examiner*—Richard J. Gregson

[57] ABSTRACT

A device for an isochronous data communication system between a first data terminal having a first clock and a remote communication unit having a second clock. A clock multiplex circuit receives the first and second clock signals. A logic means selects either the first or second clock signal as a data timing signal. The data timing signal will correspond with the second clock signal if present, if no second clock signal is present then the data timing signal will correspond with the first clock signal. A communication control device receives the data timing signal for controlling the timing of the communication.

10 Claims, 12 Drawing Sheets

ACCESSIBLE REGISTERS

| BIT NO. | 0 DLAB=0 TRANSMITTER HOLDING REGISTER (WRITE ONLY) | 1 DLAB=0 INTERRUPT ENABLE REGISTER | 2 INTERRUPT IDENT. REGISTER (READ ONLY) | 2 FIFO CONTROL REGISTER (WRITE ONLY) | 3 LINE CONTROL REGISTER |
|---|---|---|---|---|---|
| | THR | IER | IIR | FCR | LCR |
| 0 | DATA BIT 0 | ENABLE RECEIVED DATA TO TIMEOUT INTERRUPT (ERBH) | "0" IF INTERRUPT PENDING | FIFO ENABLE | WORD LENGTH SELECT BIT 0 (WLSO) |
| 1 | DATA BIT 1 | ENABLE TRANSMITTER HOLDING REGISTER EMPTY (ETBEI) | INTERRUPT ID BIT (0) | RCVR FIFO RESET | WORD LENGTH SELECT BIT 1 (WLS1) |
| 2 | DATA BIT 2 | ENABLE RECEIVER LINE STATUS INTERRUPT (ELSI) | INTERRUPT ID BIT (1) | XMIT FIFO RESET | NUMBER OF STOP BITS (STB) |
| 3 | DATA BIT 3 | ENABLE MODEM STATUS INTERRUPT (EDSSI) | INTERRUPT ID BIT (2) (NOTE 2) | MDA MODE SELECT | PARITY ENABLE (PEN) |
| 4 | DATA BIT 4 | 0 | 0 | RESERVED | EVEN PARITY SELECT (EPS) |
| 5 | DATA BIT 5 | 0 | 0 | RESERVED | STICK PARITY |
| 6 | DATA BIT 6 | 0 | 0 | RCVR TRIGGER (LSB) | SET BREAK |
| 7 | DATA BIT 7 | 0 | FIFO ENABLE (NOTE 2) | RCVR TRIGGER (MSB) | DIVISOR LATCH ACCESS BIT (DLAB) |

NOTE 1: BIT 0 IS THE LEAST SIGNIFICANT BIT. IT IS THE FIRST BIT SERIALLY TRANSMITTED OR RECEIVED.
NOTE 2: THESE BITS ARE ALWAYS 0 IN THE CHARACTER MODE.

FIG. 10A

ACCESSIBLE REGISTERS

| BIT NO. | 4 | 5 | 6 | 7 | 0 DLAB=1 | 1 DLAB = 1 |
|---|---|---|---|---|---|---|
| | MODEM CONTROL REGISTER | LINE STATUS REGISTER | MODEM STATUS REGISTER | SCRATCH REGISTER | DIVISOR LATCH (LS) | LATCH (MS) |
| | MCR | LSR | MSR | SCR | DLL | DLM |
| 0 | DATA TERMINAL READY (DTR) | DATA READY (DR) | DELTA CLEAR TO SEND (DCTS) | BIT 0 | BIT 0 | BIT 8 |
| 1 | REQUEST TO SEND (RTS) | OVERRUN ERROR (OE) | DELTA DATA SET READY (DDSR) | BIT 1 | BIT 1 | BR 9 |
| 2 | OUT 1 | PARITY ERROR (PE) | TRAILING EDGE RING INDICATOR (TERI) | BIT 2 | BIT 2 | BIT 10 |
| 3 | OUT 2 | FRAMING ERROR (FE | DELTA DATA CARRIER DETECT (DDCD) | BIT 3 | BIT 3 | BIT 11 |
| 4 | LOOP | BREAK INTERRUPT (BI) | CLEAR TO SEND (CTS) | BIT 4 | BIT 4 | BIT 12 |
| 5 | 0 | TRANSMITTER HOLDING REGISTER (THRE) | DATA SET READY (DSR) | BIT 5 | BIT 5 | BIT 13 |
| 6 | 0 | TRANSMITTER EMPTY (TEMT) | RING INDICATOR (RI) | BIT 6 | BIT 6 | BIT 14 |
| 7 | 0 | ERROR IN RCVR FIFO (NOTE 2) | DATA CARRIER DETECT (DCD) | BIT 7 | BIT 7 | BIT 15 |

FIG. 10B

COMMUNICATION DEVICE FOR TRANSMITTING ASYNCHRONOUS FORMATTED DATA SYNCHRONOUSLY

BACKGROUND OF THE INVENTION

The present invention relates generally to a device for a data communication system, and more particularly to a device and method for controlling the transmission and reception of data characters between a personal computer and a synchronously clocked datalink utilizing an isochronous data communication system.

In data communications utilizing personal computers, there are generally two modes of sending and receiving data, A) Asynchronous transmission and B) Synchronous transmission. Asynchronous transmissions involve the communication of data in which the amount of time between each byte of data transmitted may vary in a nonuniform manner. Accordingly, in order for the receiving system to properly receive a character, each character begins and ends by framing bits which are known as a start bit and stop bit. Because asynchronous transmissions frame their characters, and their characters are sent in a non-uniform manner, no timing circuits are required to coordinate the receiving system's registering of the incoming data and the transmitting systems transmission of the data.

Synchronous transmissions involve transmissions in which the sending and receiving systems operate continuously and at substantially the same frequency. The sending system and receiving system synchronize their respective clocks so that the receiving system is programmed when to sample for each transmitted character byte. Synchronous systems enable data to be communicated more rapidly than asynchronously. However, there is a greater complexity and cost of synchronous systems over asynchronous systems due to the circuitry necessary to derive the timing from the incoming data.

Originally, small amounts of data were communicated by personal computers (PC) to its peripherals in non-uniform transmissions. Accordingly, PCs utilized circuitry designed for asynchronous communication. A standard circuit design for asynchronous communications is based on the National Semiconductor 8250/16450/16550 which utilizes communication components commonly known as Asynchronous Communication Elements (ACE) which is an Universal Asynchronous Receiver/Transmitter (UART). Accordingly, most communication software developed for PCs are designed to be compatible with the ACE and utilize an internally generated clock for data byte timing and asynchronous communications. Various modems which transmit data asynchronously exist which can transmit data from 2400 bits per second to 19,200 bits per second based on the internally generated clock signal.

However, with the emergence of digital phone services and satellite links which utilize digital synchronous datalinks transmitting data at 64,000 bits per second a need has arisen to enable a standard PC to transmit more data at a higher speed requiring synchronous communications capability. Yet, since most PCs utilize asynchronous communication systems these PCs are unable to transmit data synchronously. While some modems exist which can communicate asynchronously and synchronously, these systems are complicated and expensive.

An alternative to having a modem which will work both asynchronously and synchronously, is to provide the PC with a clock signal from the receiving system if the receiving system can receive data synchronously, this is known as isochronous communication.

Accordingly, a need exists for an inexpensive method which will enable a PC to transmit data isochronously when the receiving station can receive synchronously transmitted data. However, due to the existence of the numerous existing PCs which utilize ACE and affiliated communication software, the isochronous method system should be compatible with the ACE standard enabling ACE systems to synchronously transmit data.

Accordingly, it is an object of the present invention to provide a device enabling an asynchronous communication element to communicate data synchronously utilizing a low cost isochronous communication method.

Additionally, it is an object of the invention to provide a simple interface device enabling personal computers to communicate synchronously while maintaining compatibility with existing asynchronous software which utilizes the National Semiconductor 8250/16450/16550 standard;

Another object of the invention is to provide a device having an interface circuit that allows PCs to communicate synchronously which may be embedded in a semiconductor chip which utilizes the same mechanical connections as existing National Semiconductor 8250 Asynchronous Communication Element family of devices;

Furthermore, it is an object of the invention to provide a simple interface device that allows PC's to communicate isochronously but may also communicate data asynchronously when an external clock signal is not present;

Additionally, it is an object of the present invention to provide a method for communicating data synchronously between a remote communication unit and a data terminal having asynchronous communication capability.

SUMMARY OF THE INVENTION

The above objectives are accomplished according to the present invention by providing a device for an isochronous data communication system between a first data terminal and a remote communication unit. The device will enable data communication between the first data terminal which utilizes an asynchronous communication device and the remote communication unit to occur synchronously if the remote communication unit is designed to receive data synchronously. The first data terminal includes an internal clock for generating a clock signal which is generally used for asynchronous data communication. The remote communication unit includes an external clock generating an externally transmitted clock signal which is transmitted to the first data terminal.

The device includes a clock multiplex circuit for receiving the internally generated clock signal and also for receiving the externally transmitted clock signal. The clock multiplex circuit is operatively connected to a logic means which selects either the externally generated clock signal or the internally generated clock signal as the data timing signal which will be used for timing the communication of data between the first data terminal and the remote communication unit. If an externally generated clock signal is present, then this clock signal will be used as the basis for the data timing signal, if no externally generated clock signal is present, then the internally generated clock signal will be the basis for the data timing signal. The device also includes a communication control device for controlling the communication of data between the first data terminal and the remote communication unit. The communication control device is operatively connected with the clock multiplex circuit and receives the data timing signal transmitted from the clock multiplex circuit for controlling the timing of the communication.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 10 provides a table that summarizes the contents of the accessible registers of the Asynchronous Communications Element;

DESCRIPTION OF A PREFERRED EMBODIMENT

Figure 1:
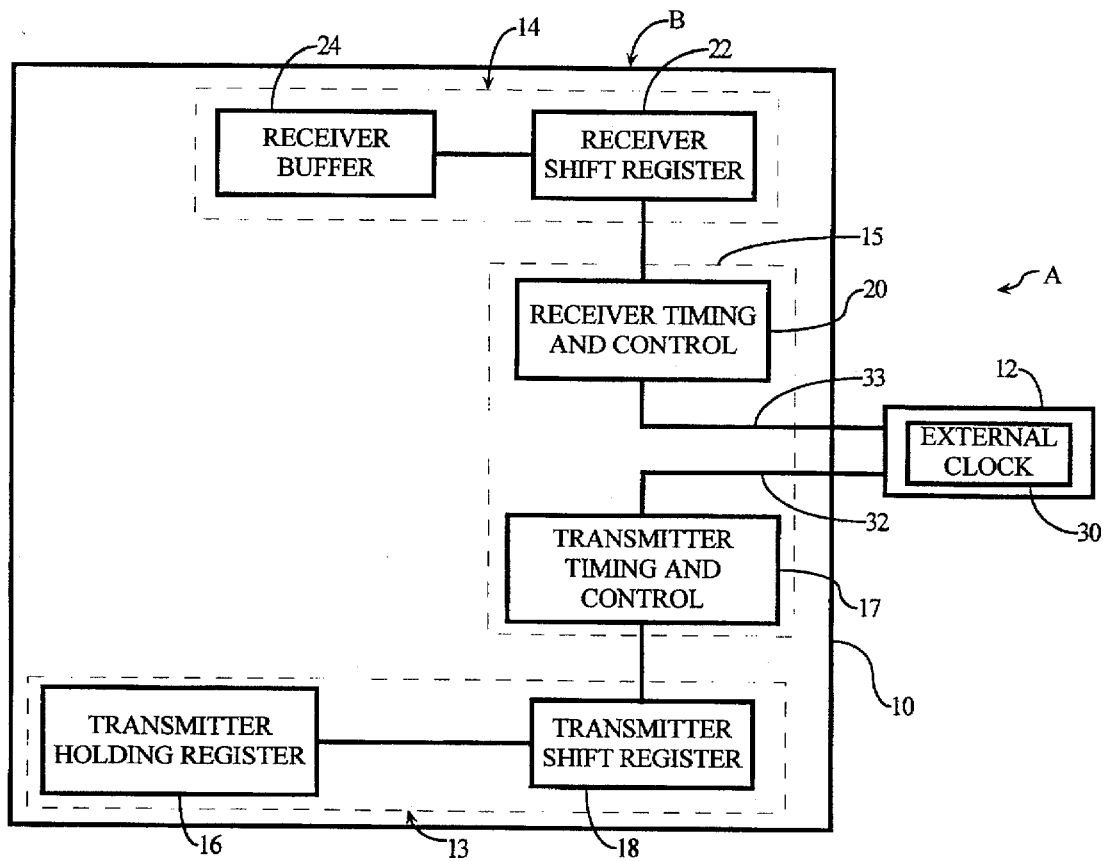
FIG. 1 is a schematic of a device for isochronous communication according to the invention.
Figure 3:
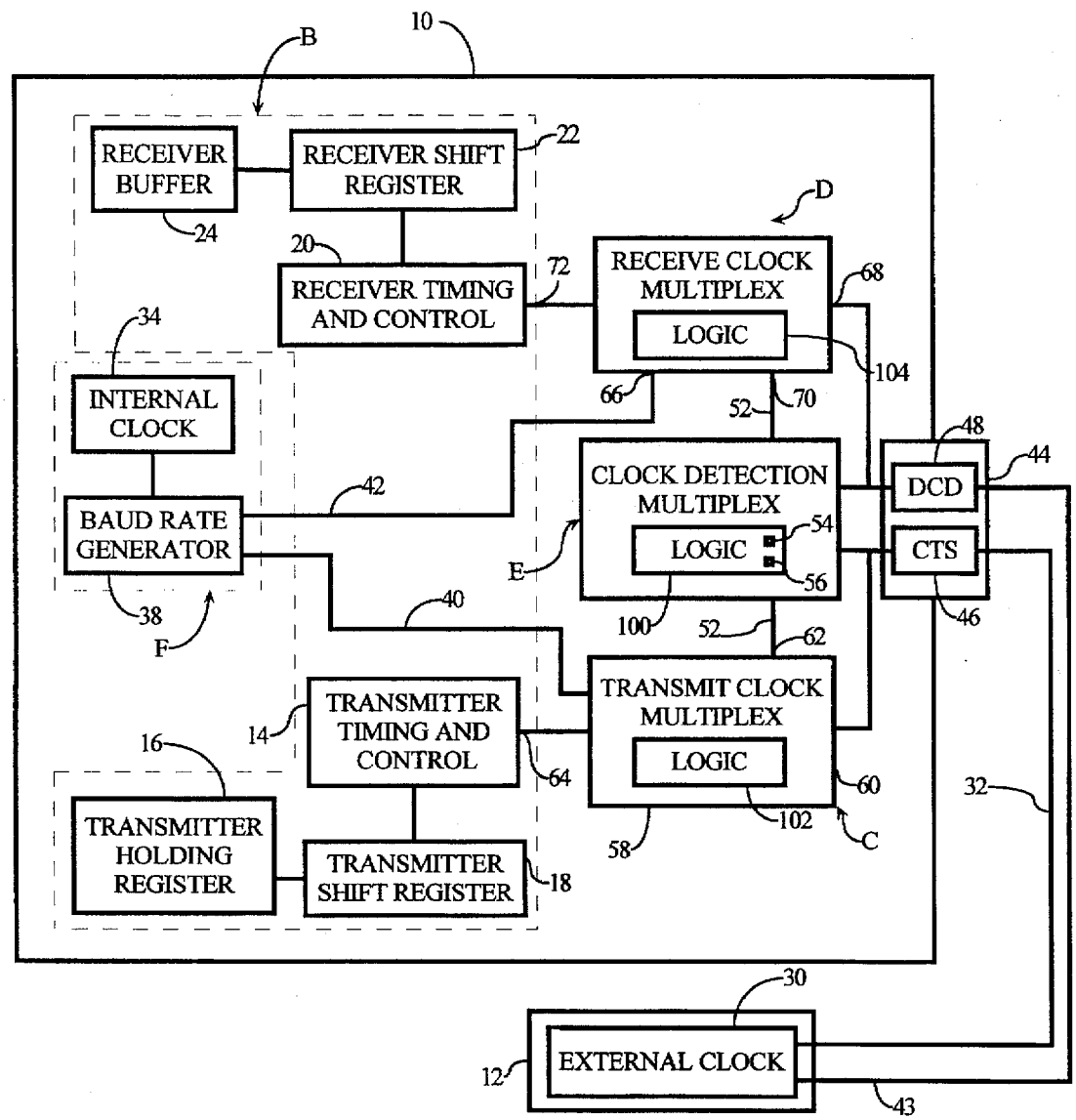
FIG. 3 is a schematic of a device for isochronous communications according to the invention.

Referring now in more detail to the drawings, the invention will now be described in more detail. FIGS. 1 and 3 illustrate an isochronous data communication device designated generally as A for communicating data isochronously between first data terminal 10 and remote communication unit 12. In the preferred embodiment, remote communication unit 12 utilizes a digital connection with first data terminal 10 for digital transmissions associated with Integrated Services Digital Networks and other related digital communications. Isochronous data communication device A includes a communication element designated generally as B. As shown in FIG. 3, Isochronous data communication device A also includes a transmitting clock multiplex circuit designated generally as C; a receive clock multiplex circuit designated generally as D; and a clock detection and multiplex control circuit designated generally as E.

As shown in FIGS. 1 and 3, communication element B has data communication components which include a transmitting unit 13 and a receiving unit 14 which are controlled by a communication control device 15 for controlling the communication of data between first data terminal 10 and remote communication unit 12. For transmitting data isochronously from first data terminal 10 to remote communication unit 12, transmitting unit 13 includes transmitter holding register 16 and transmitter shift register 18. Communication control device 15 includes a transmitter timing and control circuit 17 for controlling the transmission of data from transmitter shift register 18. For receiving data, receiving unit 14 includes a receiver shift register 22, and a receiver buffer register 24. Communication control device 15 includes receiver timing and control circuit 20 for controlling the receipt of data by receiver shift register 22.

An essential purpose of isochronous data communication device A is compatibility with communication software developed which utilizes a standard Asynchronous Communication Element (ACE) device manufactured by National Semiconductor known as NS 8250/16450/16550 family and identified in U.S. Pat. No. 4,823,312 (hereinafter ACE patent) which is incorporated by reference. In the preferred embodiment, communication element B is of the same design as an ACE and similar components have similar names, i.e. receiver shift register 38 of the ACE patent is analogous to receiver shift register 22 of FIG. 2. Accordingly, as shown in FIG. 10, transmitter timing and control circuit 14, transmitter holding register 16, transmitter shift register 18, receiver timing and control circuit 20, receiver shift register 22, and receiver buffer register 24 have the same registers and communication addresses as similar components of the ACE as detailed in the ACE patent. By providing the components of communication element B with the same communication addresses as the components of the ACE patent, the communication software designed to be used in conjunction with the ACE device, such as ProComm® manufactured by Datastorm Technologies, Inc. of Columbia, Mo., will be communicably operative with communication element B.

For isochronous data communication, remote communication unit 12 utilizes an external clock 30 for generating a communication clock signal which in the preferred embodiment consists of external transmit clock signal 32 and external receiving clock signal 33. In the preferred embodiment, transmit clock signal 32 and external receiving clock signal 33 are equivalent and at a rate enabling sixty-four thousand bits of data to be communicated per second between remote communication unit 12 and first data terminal 10. Both external transmit clock signal 32 and external receive clock signal 33 are transmitted to the data communication components of first data terminal 10. By providing first data terminal 10 with the same clock signal which remote communication unit 12 utilizes for data communications, the communication systems of first data terminal 10 and remote communication unit 12 will be synchronized for high speed data transmissions.

External transmit clock signal 32 is received at first data terminal 10 by transmitter timing and control circuit 14. Transmitter timing and control circuit 14 controls the transmission of data from transmitter shift register 18 to remote communication unit 12 based on external transmit clock signal 32. External receive clock signal 33 is received by receiver timing and control circuit 20. Receiver timing and control circuit 20 controls the reception of data transmitted from remote communication unit to receiver shift register 22 based on external receive clock signal 33. In this configuration, all data communications between first data terminal 10 and communication unit 12 are controlled by external transmit clock signal 32 directly communicating with transmitter timing and control circuit 14 and external receive clock 33 directly communicating with receiver timing and control circuit 20 for synchronizing data communications between first data terminal 10 and remote communication unit 12.

Figure 2:
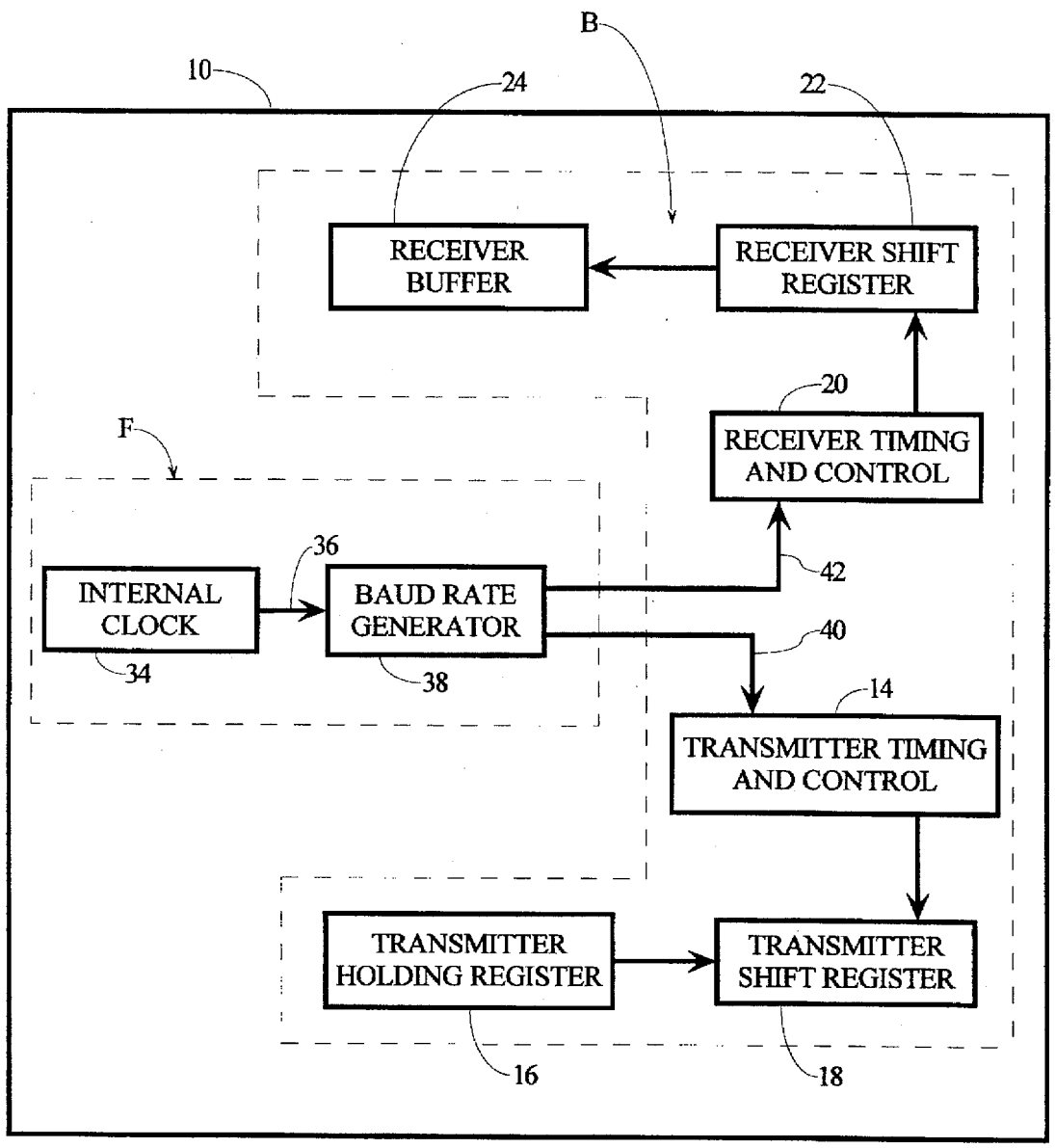
FIG. 2 is a schematic of an asynchronous communication element.

In a second embodiment shown in FIG. 3, isochronous data communication device A is designed to transmit and receive data asynchronously and isochronously. As shown in FIGS. 2 and 3, isochronous data communication device A is similar to an asynchronous communication element and includes communication element B and internal asynchronous clocking unit F. For transmitting data asynchronously, internal asynchronous clocking unit F includes an internal clock 34 which sends and internal clock signal 36 to baud rate generator 38. Baud rate generator 38 generates internal asynchronous transmitting timing signal 40 which will be used by transmitter shift register 18 for asynchronously transmitting data to remote record data terminal 12.

For receiving data asynchronously, internal clock 34 sends internal clock signal 36 to baud rate generator 38 which transmits internal asynchronous receiving timing signal 42 which will be used by receiver shift register 22 to asynchronously receive data from remote communication unit 12. Internal asynchronous clocking unit F is of the same design as an ACE and similar components have similar names. It is to be understood that internal clock 34 may be comprised of separate clocks for generating internal transmitting and receiving signals.

For communicating data, first data terminal 10 utilizes serial connector 43 which interfaces with serial port 44 which may be compatible with one of either RS 232/422/423 and 449 standards or any other similar standards. Accordingly all pin designations of serial connector 43 will be defined using RS 232 nomenclature, but it is to be understood that various pins may be selected which will practice the invention.

Figure 9:
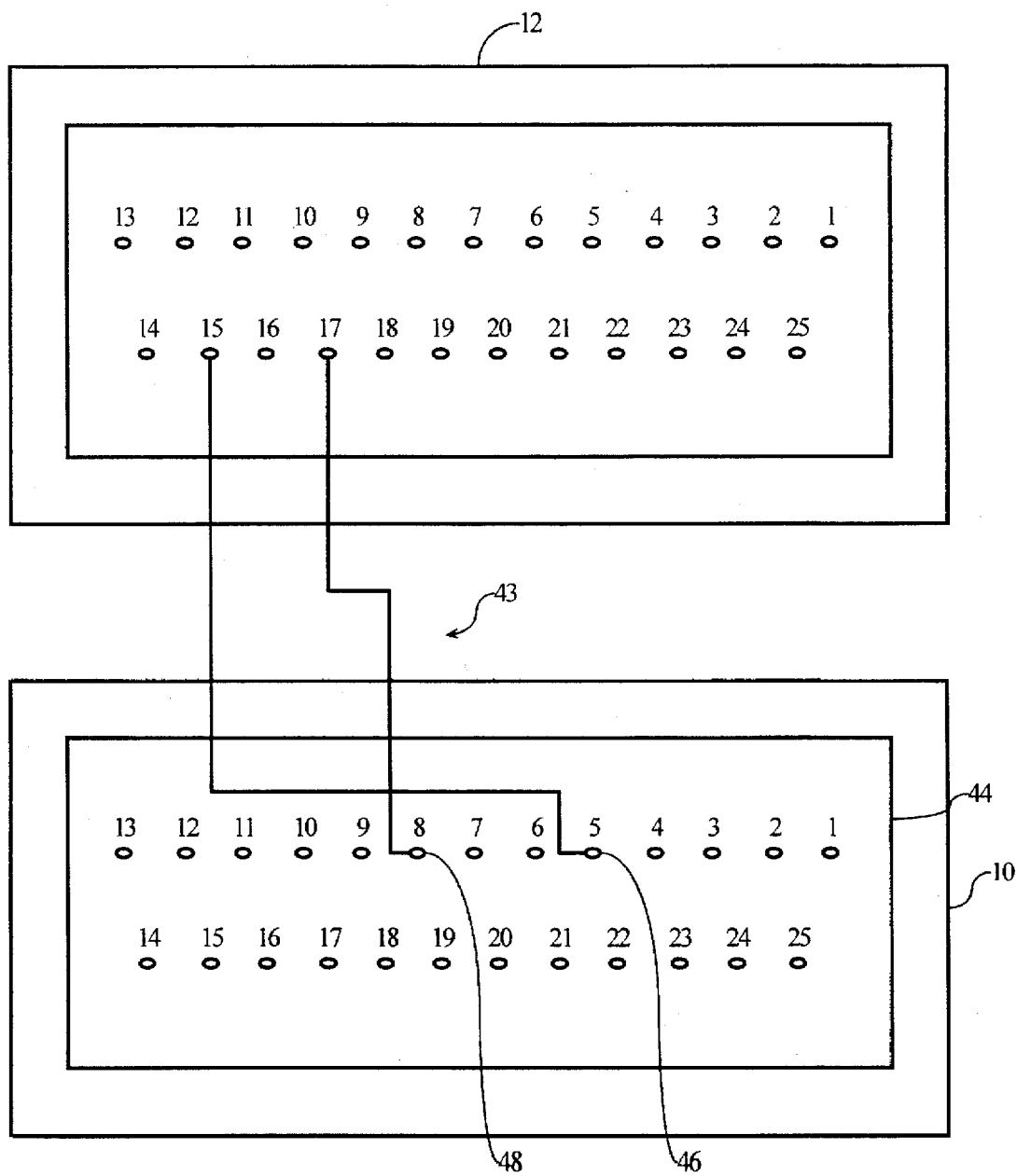
FIG. 9 is a block diagram of the routing of the external clock signals from a remote data communication unit to a data terminal according to the invention.

As shown in FIGS. 3 and 9, for isochronous communications, isochronous data communication device A receives external transmit clock signal 32 and external receiving clock signal 33 over selected pins of serial connector 43 interfaced with serial port 44. Usually for synchronous communications, external clocks are transmitted over transmitter-signal-element-time pin fifteen and receiver-signal-element-timing pin seventeen of serial connector 43. However, asynchronous communication software, which is designed to be used with an ACE and which communication element BF is designed to be compatible with, is designed for asynchronous transmissions and not designed to detect external clock signals across transmitter-signal-element-time pin fifteen and receiver-signal-element-timing pin seventeen. Accordingly, to be fully compatible with asynchronous communication software designed for use with ACE, the external transmit clock signal is received by serial port 44 along clear-to-send pin five 46 of serial connector 43 and the external receiver clock signal is received by serial port 44 along data-carrier-detect pin eight 48 of serial connector 43. FIG. 9, illustrates serial connector 43 having clock signals received from remote communication unit 12 across transmitter-signal-element-time pin fifteen routed to clear-to-send-pin five 46 and receiver-signal-element-timing pin seventeen routed to data-carrier-detect pin eight 48 for receipt by first data terminal 10.

Figure 4:
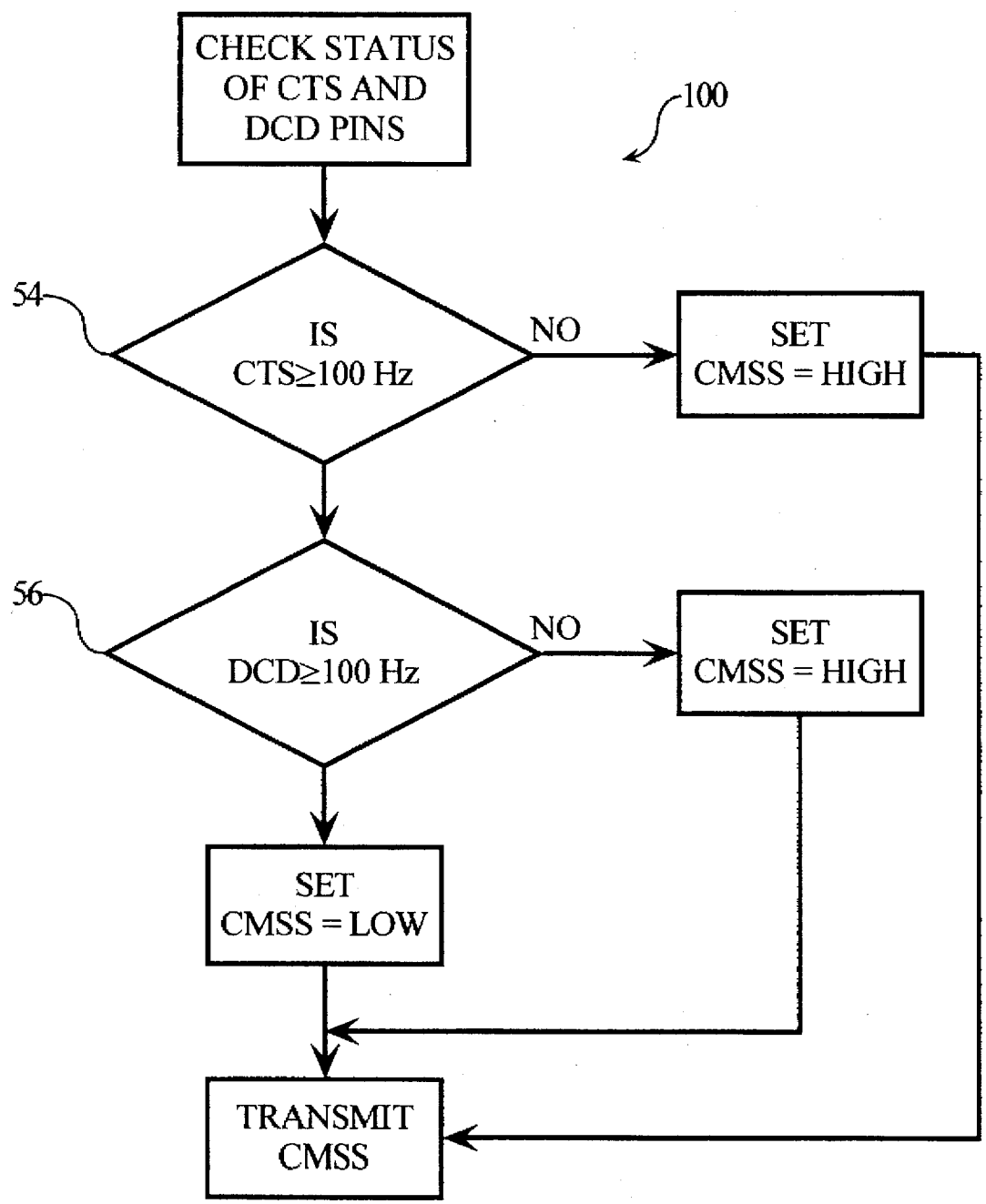
FIG. 4 is a flow diagram of the logic of a clock detection and multiplex control circuit according to the invention.
Figure 5:
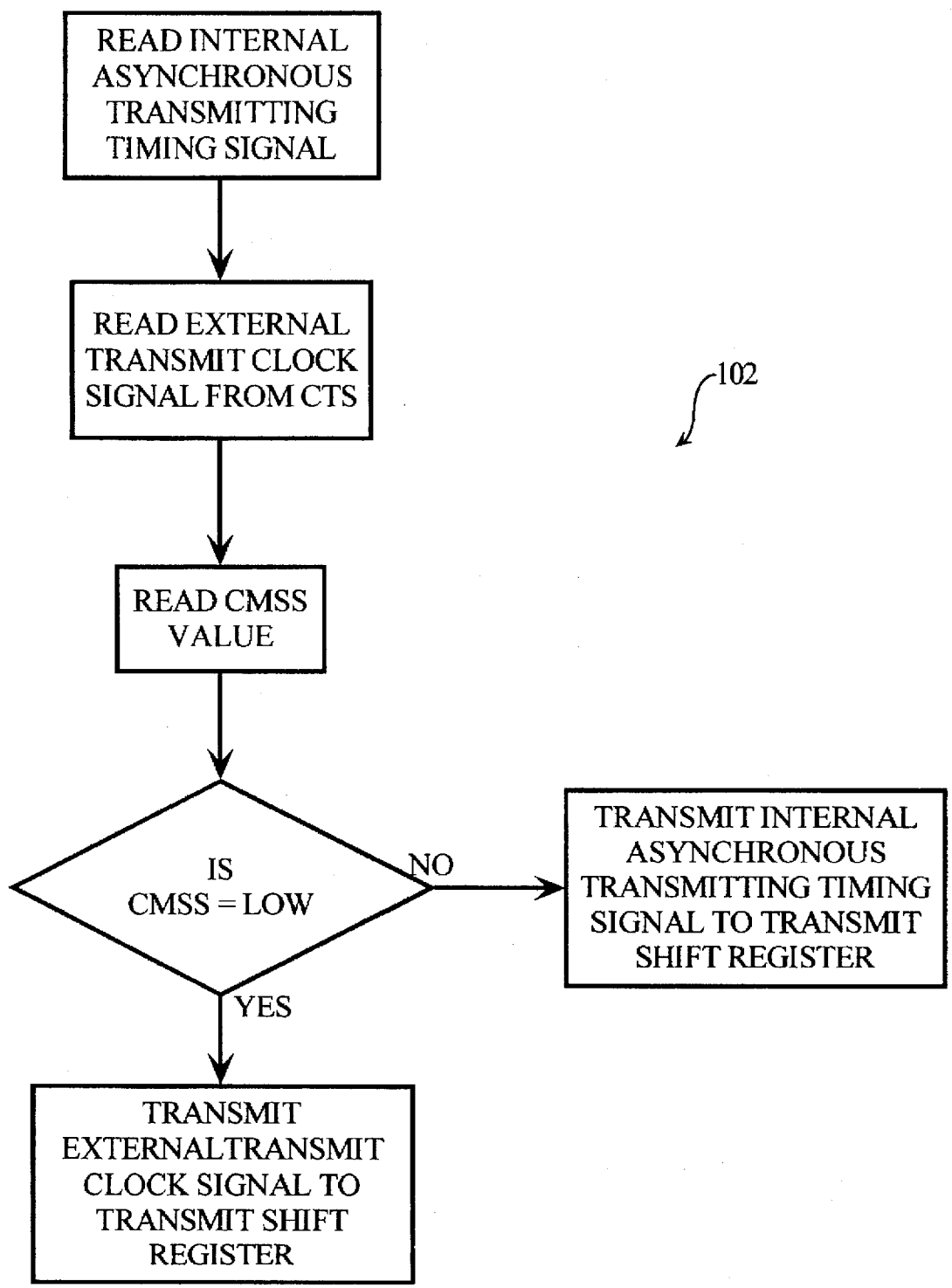
FIG. 5 is a flow diagram of the logic used by a transmit clock multiplex circuit according to the invention for selecting an internal or external clock for data timing.
Figure 6:
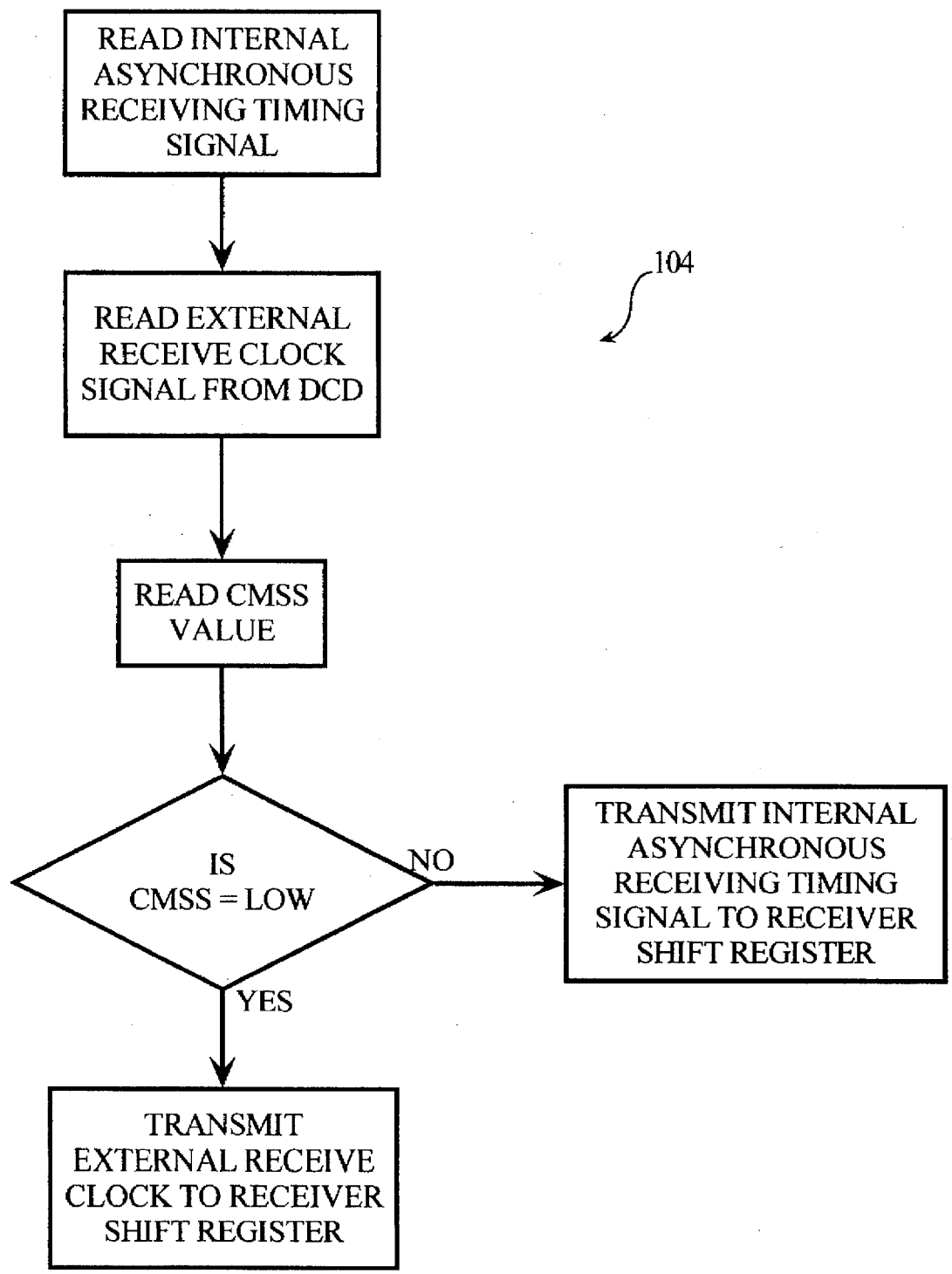
FIG. 6 is a flow diagram of the logic used by a receive clock multiplex circuit according to the invention for selecting an internal or external clock for data timing.
Figure 7:
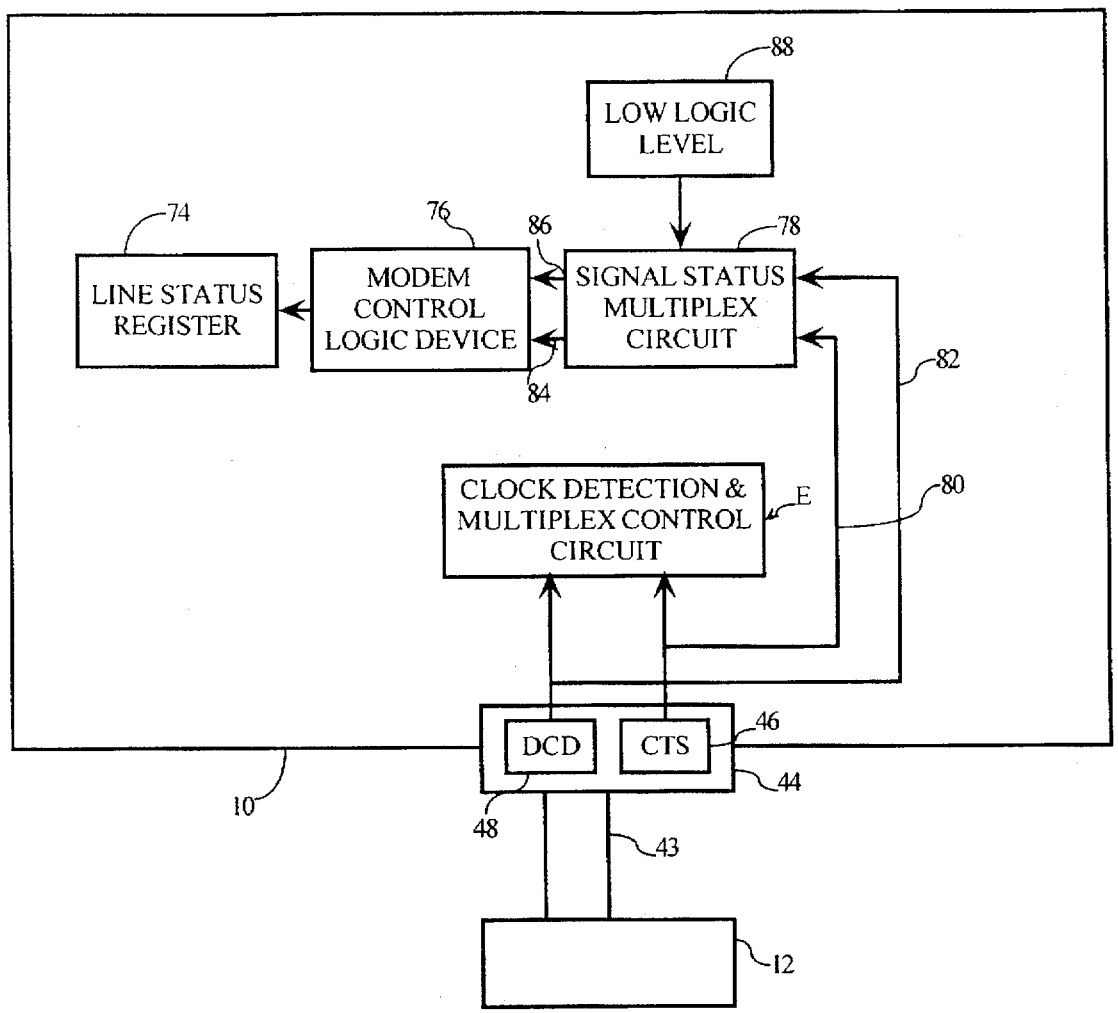
FIG. 7 is a schematic of the circuits for maintaining the status of the clear-to-send pin and data-carrier-detect pin in the line status register of an asynchronous communication element according to the invention.
Figure 8:
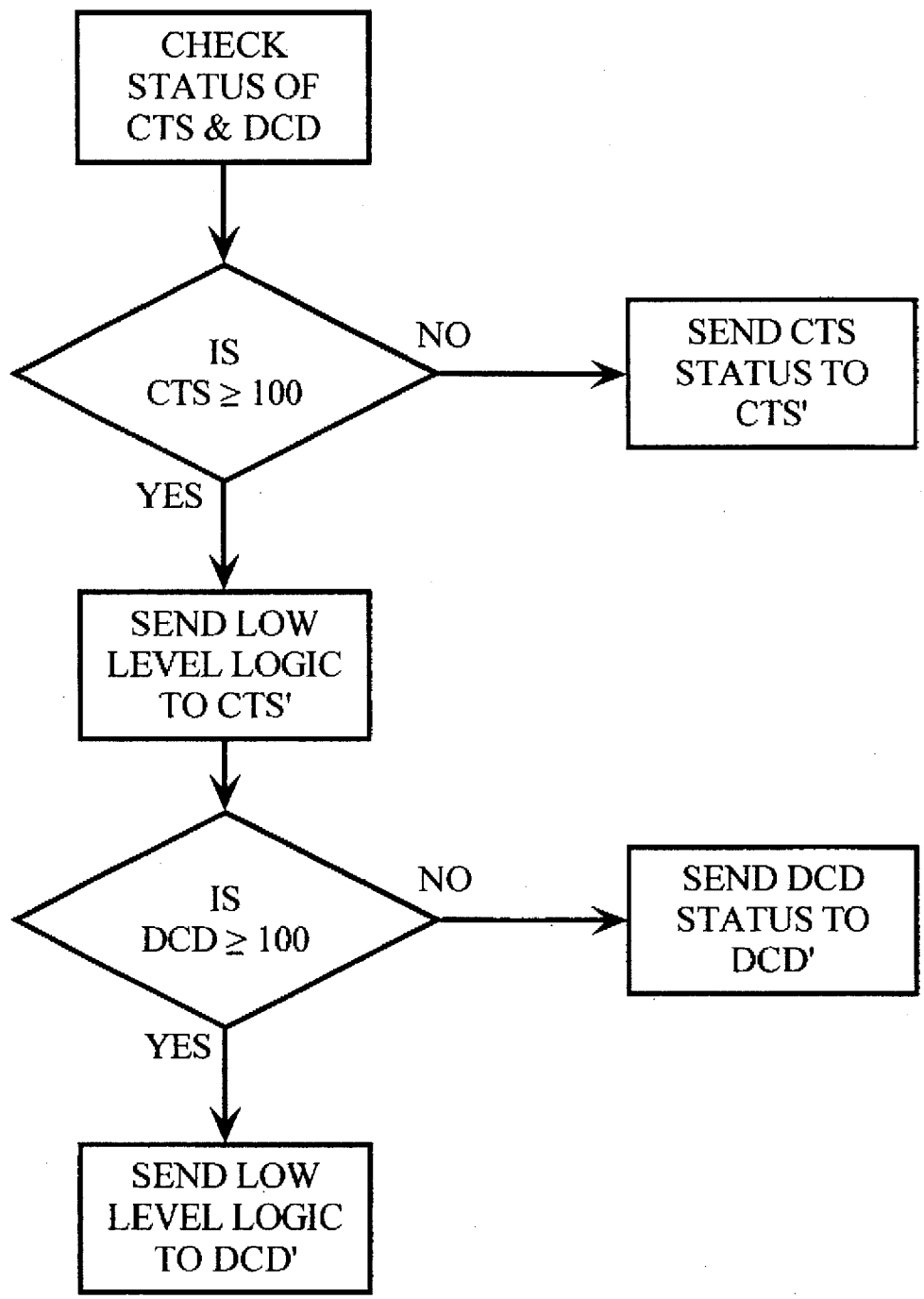
FIG. 8 is a flow diagram of the signal status multiplex circuit according to the invention.

As shown in FIGS. 3, a clock multiplex circuit for determining the selection of an internal or external clock includes Clock detection and multiplex control circuit E, and transmit clock multiplex C and receive clock multiplex D. Transmit clock multiplex C is utilized for determining the data timing signal for data transmissions and Receive clock multiplex D is utilized for determining the data timing signal for the reception of data by first data terminal 10. Also, logic means are utilized for determining the selection of an internal clock or an external clock function in conjunction with the respective multiplex circuits. Clock detection and multiplex control circuit E utilizes clock detection multiplex logic 100 illustrated in FIG. 4, Transmit clock multiplex C utilizes transmit clock multiplex logic 102 illustrated in FIG. 5, and Receive clock multiplex D utilizes receive clock multiplex logic 104 illustrated in FIG. 6. It is to be understood that Transmit clock multiplex circuit C and Receive clock multiplex D may contain logic circuits for ascertaining the presence of external transmit clock signal 32 which would not require the presence of Clock detection and multiplex control circuit E.

Clock detection and multiplex control circuit E is connected to data-carrier-detect pin eight 48 and clear-to-send pin five 46 to detect the presence of an external transmit and receive clock signal. Clock detection circuit F generates a clock multiplex select signal (CMSS) 52 which is routed to both Transmit clock multiplex circuit C and Receive clock multiplex circuit D. Clock detection multiplex circuit E comprises of two missing pulse detectors set to an initial threshold. In the preferred embodiment this threshold is 100 hertz. Thus if a signal is presented to Clock detection and multiplex control circuit E from clear-to-send pin five 46 and data-carrier-detect pin eight 48 which is above the initial threshold, it is assumed that this signal is a valid external clock. If the signal is below the initial threshold, it is assumed that no clock is present.

Clock detection and multiplex logic 100 contains a transmit clock detector 54 and a receiver clock detector 56. Both clock detectors 54 and 56 are logically <anded> together to produce CMSS 52. Accordingly, if both clear-to-send pin 46 and data-carrier-detect-pin 48 have a valid clock present, CMSS 52 will be at a logic low level. If either clear-to-send pin 48 or data-carrier-detect pin 48 do not have a valid clock applied, then CMSS 52 will be at a logic high level. The value of CMSS 52 is routed to both Transmit clock multiplex circuit C and Receive clock multiplex circuit D.

Transmit clock multiplex circuit C determines whether internal asynchronous transmitting timing signal 40 or external transmit clock signal 32 will be the transmitting data timing signal used for transmitting data from transmitter shift register 18 to a remote communication unit 12. Transmit clock multiplex circuit C is operatively connected between internal baud generator 38 and transmitter timing and control circuit 14. Transmit clock multiplex circuit C has a first transmit connect point 58 which receives internal asynchronous transmitting timing signal 40 from internal baud generator 38, a second transmit connect point 60 which receives external transmit clock signal 32 from clear-to-send pin 46, and a third transmit connect point 62 which receives CMSS 52. The transmitting data timing signal outputted by Transmit clock multiplex circuit C is transmitted to transmit clock signal connector 64 on transmitter timing and control circuit 14. Accordingly, the rate at which data is shifted out of transmitter shift register 18 is selected by CMSS 52. If CMSS 52 is at a logic high level, internal asynchronous transmitting timing signal 40 will be the transmitting data timing signal sent to transmit clock signal connector 64, but if CMSS 52 is at a logic low level, then transmit clock signal connector 64 is provided external transmit clock signal 32 carried by clear-to-send pin 46.

Receive clock multiplex circuit D determines whether internal asynchronous receiving timing signal 42 or external receive clock signal 33 will be the receiving data timing signal used for receiving data by receiver shift register 22. Receive clock multiplex circuit D, is operatively connected between internal baud generator 38 and receiver timing and control circuit 20. Receive clock multiplex circuit E is similar to Transmit clock multiplex circuit D and has a first receiver connect point 64 which receives internal asynchronous receiving timing signal 42, a second receiver connect point 68 which receives external clock signal 33 from data-carrier-detect pin 48, and a third receive connect point 70 which receives CMSS 52. The receiving data timing signal outputted by Receive clock multiplex circuit E is connected to receive clock signal connector 72 on receiver timing and control circuit 20. Accordingly, the receiving data timing signal controlling the rate at which data is received into receiver shift register 22 is selected by CMSS 52. If CMSS signal 52 is at a logic high level, internal asynchronous receiving timing signal 42 will be the receiving data timing signal sent to receive clock signal connector 72, but if CMSS signal 52 is at a logic low level, then receive clock signal connector 72 receives external receive clock signal 33 carried by data-carrier-detect pin 48. Accordingly, reception of data will be controlled by the external clock on the data-carrier-detect pin.

In a standard asynchronous communication element, the normal status of clear-to-send pin 46 and data-carrier-detect pin 48 is normally monitored in line status register 74 which is operatively connected with modem control logic device 76. To maintain compatibility with other features of the standard asynchronous communication element, these status signals must also be controlled by clock detection and multiplex control circuit E and modem control logic device 76 which receives the status signals from signal status multiplex circuit 78. Signal status multiplex circuit 78 receives CMSS 52 and a signal from the pin carrying the external clock signal which in the preferred embodiment is the clear-to-send pin and/or the data-carrier-detect pin. Accordingly, signal status multiplex circuit 78 receives clear-to-send signal 80 and/or data-carrier-detect signal 82. Clear-to-send status signal 84 carries the status of clear-to-send pin 46 to modem control logic circuit 76 and data-carrier-detect status signal 86 carries the status of data-carrier-detect pin 48 to modem control logic circuit 76. When valid external clocks are detected, CMSS 52 is at a low logic level selecting the "on" or active low logic levels 88 for both carrier-detect status signal 84 and data-carrier-detect status signal 86. If CMSS 52 is at a high level indicating that no external clocks are detected, then status signal multiplex circuit 78 routes the clear-to-send signal 80 to clear-to-send status signal 84 and the data-carrier-detect signal 82 to data-carrier-detect status signal 86 to modem control logic circuit 76. This action mimics the signals' functions in a normal asynchronous environment.

Most communication software ignore the status of the clear-to-send pin and data-carrier-detect pins because of the advent of "smart" modems. "Smart" modems require only a transmit, receive and signal ground connection. Communication software that did require the use of clear-to-send signals and data-carrier-detect signals would be satisfied by the signal multiplex circuit mimic of these signals active state.

Figure 11:
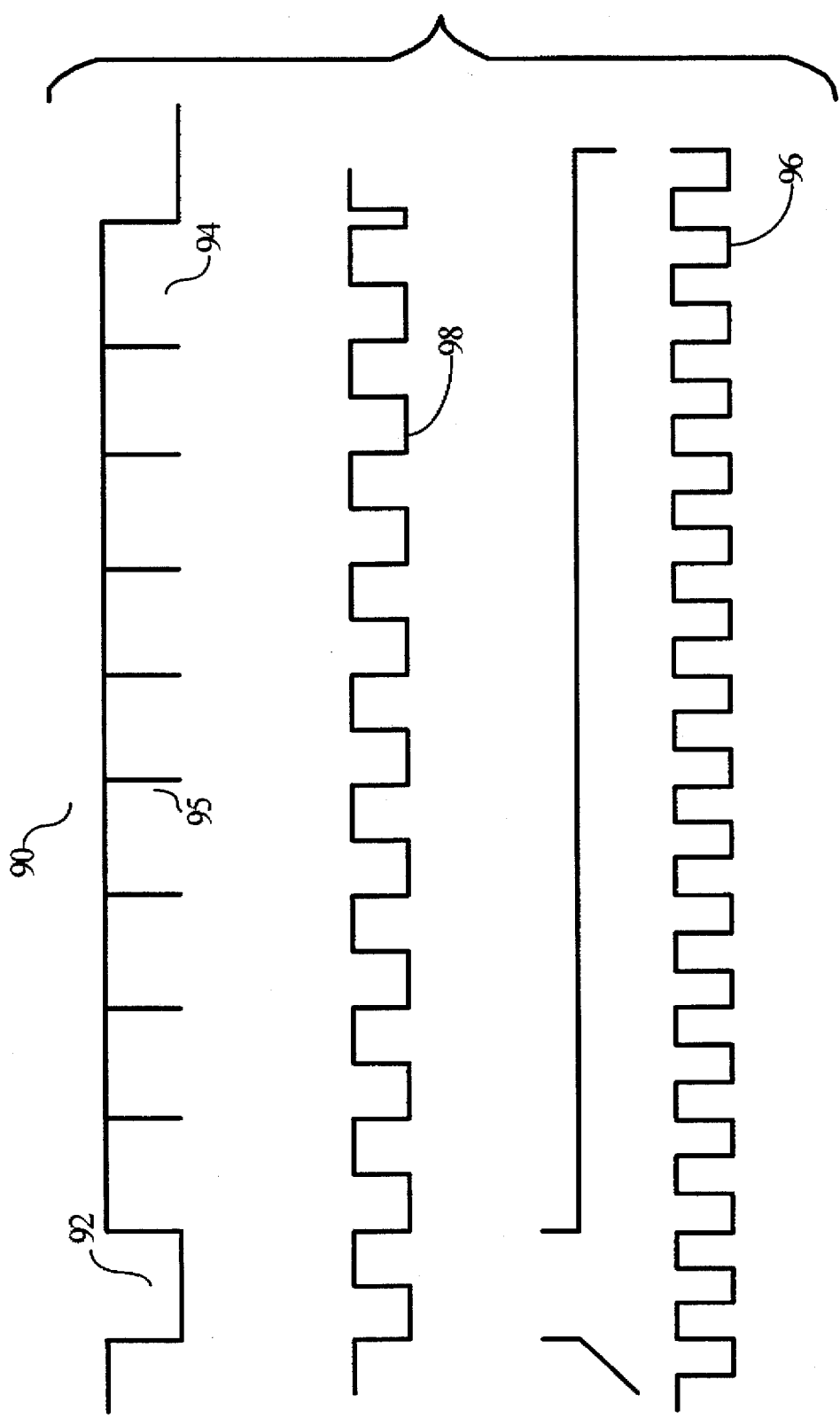
FIG. 11 illustrates the sampling of data in relation to an external clock and an internal clock as utilized by the invention.

FIG. 11 illustrates the sampling of data in relation to an external clock and an internal clock. Data byte 90 which is transmitted utilizing asynchronous communication software requires a start bit 92 and a stop bit 94 and character bits 95. To facilite the communciation of data asynchronously, the standard UART utilizes an internal clock signal divided by sixteen; a sixteen times clock 96. The sixteen times clock is sixteen times faster than the tranmission or reception rate of each bit signal of data byte 90, this is required to ensure that the bit changes in byte 90 is detected by the UART since the data is being transmitted asynchronously.

Synchronous transmissions only require the use of a one times clock 98. Since the receiving unit and transmitting unit are communicating data synchronously, the clock is only required to be in phase with the data. By having the communication synchronized, faster data transmission rates are possible utilizing equipment and lines designed for synchronous communications. Such equipment and lines include T1 lines and associated equipment available from AT&T® and the MegaLink® ISDN Service provided by BELLSOUTH®.

Therefore, it can be seen that a more advantageous isochronous data communication system may be had according to the invention. By providing a first data terminal with an external transmit and receiving signal from a remote second communication unit communication between the two terminals may be synchronized to the same communication signals. Also, by modifying a standard asynchronous communication element for transmitting data synchronously, isochronous data communication may be had by most standard personal computers without requiring modifications to current asynchronous communication software.

While a preferred embodiment of the invention has been described using specific terms, such description is for illustrative purposes only, and it is to be understood that changes and variations may be made without departing from the spirit or scope of the following claims.

What is claimed is:

1. A device for an isochronous data communication system communicating asynchronously formatted data between a first data terminal having an internal clocking means for asynchronous communicating and a remote communication unit having an external clocking means for synchronous communication, said device comprising:

a clock multiplex circuit for receiving an internal clock signal generated by said first clocking means and for receiving an external clock signal transmitted from said second clocking means, said clock multiplex circuit transmitting a data timing signal for timing said communication of data between said first data terminal and said remote communication unit;

a logic means operatively connected with said clock multiplex circuit for determining said data timing signal, said data timing signal corresponding with said external clock signal if said external clock signal is transmitted from said remote communication unit to said clock multiplex circuit, and said data timing signal corresponding with said internal clock signal if no external clock signal is transmitted from said remote communication unit; and a communication control device operatively connected with said clock multiplex circuit for controlling said communciation of asynchronously formatted data between said first data terminal and said remote communication unit, said communication control device receiving said data timing signal transmitted from said clock multiplex circuit;

whereby communication of asynchronous formatted data between said first data terminal and remote communication unit are controlled by a clock signal transmitted by said remote communication unit if present.

2. The device of claim 1 wherein said logic means transmits a clock multiplex select signal indicating if an externally generated clock signal is present to said clock multiplex circuit for determining the value of said data timing signal.

3. The device of claim 2 wherein said first data terminal of said system includes a communication port for receiving a first pin of a communication cable carrying said second clock signal, said device including:

a signal status multiplex circuit for determining the status of said first pin, said signal status multiplex circuit receiving said clock multiplex select signal and a first-pin signal carried by said first pin, said signal status multiplex circuit transmitting a first pin status signal to a modem control logic block; and said signal status multiplex circuit transmitting said first pin status signal having a first value if said clock multiplex select signal indicates that a second clock signal is transmitted over said first pin, and if said clock multiplex select signal indicates than no second clock signal is transmitted over said first pin then said status multiplex circuit transmits said first pin status signal having a second value equal to said first pin signal.

4. A device for isochronous data communication between a first data terminal having a first clocking means generating clock signals for timing data communications and a remote communication unit having a second clocking means for generating external transmit and receive clock signals for data communication, said device comprising:

a transmitting clock multiplex circuit for receiving said clock signal from said first clocking means and for receiving said external transmit clock signal, said transmitting clock multiplex circuit for transmitting a transmitting data timing signal for timing the transmission of data between said first data terminal and said remote communication unit;

a transmitting shift register operatively connected with said transmitting clock multiplex circuit, said transmitting shift register for storing data to be transmitted from said first data terminal to said remote communication unit at a rate corresponding with said transmitting data timing signal;

a first logic means operatively connected with said transmitting clock multiplex circuit for determining said transmitting data timing signal, said transmission data timing signal to correspond with said externally generated transmit clock signal if transmitted from said remote communication unit to said transmitting clock multiplex circuit, and said data timing signal to correspond with said clock signal generated by said first clocking means if no externally generated transmit clock signal is transmitted from said remote communication unit;

a receiver clock multiplex circuit for receiving said clock signal from said first clocking means and for receiving said external receiving clock signal, said receiver clock multiplex circuit for transmitting a receiving data timing signal for timing the reception of data between said first data terminal and said remote communication unit;

a receiver shift register operatively connected with said receiver clock multiplex circuit, said receiver shift register for receiving data communicated from said remote communication unit to said first data terminal at a rate corresponding with said receiving data timing signal; and a second logic means operatively connected with said receiver clock multiplex circuit for determining said receiving data timing signal, said receiving data timing signal to correspond with said external receiving clock signal if transmitted from said remote communication unit to said receiver clock multiplex circuit, and said receiving data timing signal to correspond with said clock signal generated by said first clocking means if no external receiving clock signal is transmitted from said remote communication unit.

5. A device for isochronous data communication between a first data terminal having an internal clocking means generating clock signals for timing data communications and a remote communication unit having an external clocking means for generating external transmit and receive clock signals for data communication, said device comprising:

a transmitting clock multiplex circuit for receiving, said clock signal from said internal clocking means and for receiving said external transmit clock signal, said transmitting clock multiplex circuit for transmitting a transmitting data timing signal for timing the transmission of data between said first data terminal and said remote communication unit;

a transmitting shift register operatively connected with said transmitting clock multiplex circuit, said transmitting shift register for storing data to be transmitted from said first data terminal to said remote communication unit at a rate corresponding with said transmitting data timing signal;

a first logic means operatively connected with said transmitting clock multiplex circuit for determining said transmitting data timing signal, said transmitting data timing signal to correspond with said externally generated transmit clock signal if transmitted from said remote communication unit to said transmitting clock multiplex circuit, and said data timing signal to correspond with said clock signal generated by said internal clocking means if no externally generated transmit clock signal is transmitted from said remote communication unit;

a receiver clock multiplex circuit for receiving said clock signal from said internal clocking means and for receiving said external receiving clock signal, said receiver clock multiplex circuit for transmitting a receiving data timing signal for timing the reception of data between said first data terminal and said remote communication unit;

a receiver shift register operatively connected with said receiver clock multiplex circuit, said receiver shift register for receiving data communicated from said remote communication unit to said first data terminal at a rate corresponding with timing giving data timing signal;

a second logic means operatively connected with said receiver clock multiplex circuit for determining said receiving data timing signal, said receiving data timing signal to correspond with said external receiving clock signal if transmitted from said remote communication unit to said receiver clock multiplex circuit, and said receiving data timing signal to correspond with said clock signal generated by said internal clocking means if no external receiving clock signal is transmitted from said remote communication unit; and a plurality of data registers which are bit level compatible with a standard 16550 UART.

6. A system for data communication between a first data terminal having an internal clocking means generating internal clock signals for timing data communications and a remote communication unit having an external clocking means for generating external transmit and receive clock signals for data communication, said system comprising:

software for formatting data for asynchronous communication, said data formatted to include stop bits and start bits;

a transmitting clock multiplex circuit for receiving said internal clock signal and for receiving said external transmit clock signal, said transmitting clock multiplex circuit for transmitting a transmitting data timing signal for timing the transmission of asynchronously formatted data between said first data terminal and said remote communication unit;

a transmitting shift register operatively connected with said transmitting clock multiplex circuit, said transmitting shift register for storing asynchronously formatted data to be transmitted from said first data terminal to said remote communication unit at a rate corresponding with said transmitting data timing signal;

a first logic means operatively connected with said transmitting clock multiplex circuit for determining said transmitting data timing signal, said transmitting data timing signal to correspond with said externally generated transmit clock signal if transmitted from said remote communication unit to said transmitting clock multiplex circuit, and said data timing signal to correspond with said clock signal generated by said internal clocking means if no externally generated transmit clock signal is transmitted from said remote communication unit;

a receiver clock multiplex circuit for receiving said clock signal from said internal clocking means and for receiving said external receiving clock signal, said receiver clock multiplex circuit for transmitting a receiving data timing signal for timing the reception of asynchronously formatted data between said first data terminal and said remote communication unit;

a receiver shift register operatively connected with said receiver clock multiplex circuit, said receiver shift register for receiving asynchronously formatted data communicated from said remote communication unit to said first data terminal at a rate corresponding with said receiving data timing signal; and a second logic means operatively connected with said receiver clock multiplex circuit for determining said receiving data timing signal, said receiving data timing signal to correspond with said external receiving clock signal if transmitted from said remote communication unit to said receiver clock multiplex circuit, and said receiving data timing signal to correspond with said clock signal generated by said internal clocking means if no external receiving clock signal is transmitted from said remote communication unit; and whereby said data being transmitted at a rate corresponding with said respective data timing signal is formatted for asynchronous communication and includes stop bits and start bits which is compatible for software designed for asynchronous communication.

7. The system of claim 6 including a standard UART having a plurality of data registers which are all bit level compatible with a standard 16550 UART.

8. A method for communicating data formatted for use by an universal asynchronous receiver and transmitter device from a first data terminal having an internal clocking means generating clock signals for timing data communications and a remote communication unit having an external clocking means for generating external clock signals for data communication, said method comprising:

formatting data in an asynchronous format including start bits and stop bits for communication;

transmitting said internal clock signal to a transmitting clock multiplex circuit;

detecting the presence of said external clock signal;

defining a transmitting data timing signal, said transmitting data timing signal corresponding with said external clock signal if said external clock signal is detected or said transmitting data timing signal corresponding with said internal clock signal if no external clock signal is detected; and transmitting said asynchronously formatted data to said remote communication unit at a rate defined by said data timing signal.

9. The method of communicating data according to claim 8 further including the step of transmitting said external clock signal from said remote communication unit to a transmitting clock multiplex circuit located at said first data terminal.

10. A method for communicating data formatted for use by an universal asynchronous receiver and transmitter device from a first data terminal having an internal clocking means generating clock signals for timing data communications and a remote communication unit having an external clocking means for generating external clock signals for data communication, said method comprising:

formatting data in an asynchronous format including start bits and stop bits for communication;

transmitting said internal clock signal to a receiving clock multiplex circuit;

detecting the presence of said external clock signal;

defining a receiving data timing signal, said receiving data timing signal corresponding with said external clock signal if said external clock signal is detected or said receiving data timing signal corresponding with said internal clock signal if no external clock signal is detected; and transmitting said asynchronously formatted data to said first data terminal at a rate defined by said data timing signal.

* * * * *